United States Patent
Babu et al.

(10) Patent No.: US 6,911,119 B2
(45) Date of Patent: Jun. 28, 2005

(54) SIMPLE PORTABLE MINI DISTILLATION APPARATUS FOR THE PRODUCTION OF ESSENTIAL OILS AND HYDROSOLS

(75) Inventors: Garikapati D. Kiran Babu, Palampur (IN); Paramvir Singh Ahuja, Palampur (IN); Vijay Kumar Kaul, Palampur (IN); Virendra Singh, Palampur (IN)

(73) Assignee: Council of Scientific & Industrial Research, New Delhi (IN)

( * ) Notice: Subject to any disclaimer, the term of this patent is extended or adjusted under 35 U.S.C. 154(b) by 788 days.

(21) Appl. No.: 09/815,967

(22) Filed: Mar. 23, 2001

(65) Prior Publication Data
US 2005/0082157 A1 Apr. 21, 2005

(51) Int. Cl.[7] .............................. B01D 3/00; C10B 7/14
(52) U.S. Cl. .................. 202/83; 202/153; 202/160; 202/161; 202/233; 202/266; 202/267.1
(58) Field of Search .................... 202/83, 153, 160, 202/161, 233, 266, 267.1, 270; 203/DIG. 2

(56) References Cited

U.S. PATENT DOCUMENTS

| | | | | |
|---|---|---|---|---|
| 5,398,806 A | * | 3/1995 | Quinn | 202/83 |
| 5,786,321 A | * | 7/1998 | Mane et al. | 512/11 |
| 5,955,084 A | * | 9/1999 | Jain et al. | 424/740 |
| 6,419,796 B1 | * | 7/2002 | Kitamura et al. | 202/153 |
| 6,551,464 B1 | * | 4/2003 | Kimel | 202/153 |

* cited by examiner

*Primary Examiner*—N. Bhat
(74) *Attorney, Agent, or Firm*—Perkins Coie LLP

(57) ABSTRACT

This invention relates to a simple, convenient, portable mini-distillation apparatus for the production of essential oils and hydrosols, said apparatus is useful to distill essential oils and hydrosols such as rose water, ajowain water from fresh and dried plant material like leaves, flowers, roots and rhizomes by water distillation, water and steam distillations and as an optional, steam distillation can also be perform at atmospheric pressure as well as slightly higher and lower than atmospheric pressure, said apparatus can be heated on brick-clay furnace with small agro-waste, LPG cooking gas, electrically heated stove or kerosene/diesel burner etc. and requires minimum attention during handling; since the apparatus is made of stainless steel and glass, the essential oil distilled is of better quality.

17 Claims, 2 Drawing Sheets

SIMPLE PORTABLE MINI DISTILLATION APPARATUS FOR THE PRODUCTION OF ESSENTIAL OILS AND HYDROSOLS

FIELD OF THE INVENTION

The present invention relates to a simple, convenient, portable mini-distillation apparatus for the production of essential oils and hydrosols.

This apparatus is useful to distill essential oils and hydrosols such as rose water, ajowain water from fresh and dried plant material like leaves, flowers, roots and rhizomes by water distillation, water and steam distillations and as an optional, steam distillation can also be performed at atmospheric pressure as well as slightly higher and lower than atmospheric pressure. This unit can be heated on brick-clay furnace with small agro-waste, LPG cooking gas, electrically heated stove or kerosene/diesel burner etc. and requires minimum attention during handling. Since the apparatus is made of stainless steel and glass, the essential oil distilled is of better quality than the oil distilled by glass Clevenger type apparatus used in the laboratory.

BACKGROUND AND PRIOR ART REFERENCE

Laboratory equipment used for distillation of essential oils is called Clevenger type apparatus as shown in FIG. 1 of the drawings accompanying this specification. Reference may be made to Clevenger type, J.F., *Apparatus for the determination of volatile oil*. J. Amer. Pharm. Assoc., 17, pp. 346(1928), wherein the apparatus (1) is attached to the spherical glass vessel (a) having charged with the plant material along with water in 1:2 ratio through opening (b) which is also used for discharging the mixture after process is complete. The whole system is put on a heating mantle (c), which has an energy regulator (d) for controlling the temperature. After few minutes, the material inside starts boiling. The vapors so formed are passed through a vertical condenser (e) through a long vertical glass tube (f). The cold water around the condenser tube is circulated through inlet (g) and outlet (h). The condensed distillate gets collected in a measuring tube (i) connected to the outlet of the condenser where an air outlet (j) open to atmosphere is placed. The volatile oil separates as an upper layer, from the distillate because of its density difference, as the oil is lighter than the water. A return tube (k), for recycling of aqueous part of the distillate, connects the bottom of the measuring tube (i) and vertical tube (f). The oil is collected at the outlet by opening the stop-cock valve (l).

The major drawback of the apparatus is that it was designed to distillate the plant material by water distillation at normal atmospheric pressure only. There are some aromatic plant materials exclusively distilled by steam distillation method rather than water distillation, reason being that some of volatile constituents get hydrolyzed due to the presence of excessive water in the vessel. The apparatus works neither on the principle of steam distillation nor on water and steam distillation technique. Clevenger type apparatus is generally restricted to laboratories for the essential oil estimation but cannot be used to produce the essential oil in higher quantities. Since the system is heated up with the help of electric mantle (c) only, with very small batch capacity of material charging vessel (a), long vertical glass tube (f) and condenser (e) are made up of glass which requires careful handling and can not be heated without electricity which is difficult for a marginal farmer with small land holdings in remote areas. The recovery and quality of the essential oil distilled in this glass Clevenger type apparatus is of inferior quality. The color of the oil is generally lighter than the commercially distilled oil, which is not recommended in the market. Pure distillation is not possible since the oil is obtained with other materials/contaminants.

There are distillation units, which are operated by Water and Steam distillation method. Water and Steam distillation method involves a distillation tank with a false bottom and with or without Calendria at the bottom. Cohobation column at the top which is connected to the condenser and a distillate receiver. The plant material is charged from the charging hole and closed tightly. Prior to charging of plant material some fresh water is added to the tank and the precautions are to be taken to control the water level which should not touch the false bottom. The water level is maintained by recycling the distillate collected in the receiver to the tank or continuous or batch-wise fresh water is supplied to the tank. The tank is heated by direct firing of the agro-waste from the hearth bellow. The purpose of this method is to reduce the effect of hydrolysis of essential oil which are get hydrolyzed when they came in to continuous contact with excess water. After few minutes the water vapors starts forming and extracts the essential oil from the plant material and carries it over to condenser where they are condensed to liquid distillate. The distillate is collected in a receiver where it is separated in to two fractions; one as an essential oil and other as saturated water layer. The essential oil is separated, cleaned and then stored as per the recommended methods.

The major drawbacks of the unit are that it can not distill the plant material by Steam distillation. Some parts of the aromatic herbs such as cedar wood, sandalwood are preferably distilled by Steam distillation method to obtain better recoveries and quality. Also these units can not distill the plant material neither at reduced pressure nor at higher pressure since the system is opened to the atmospheric pressure and can not operated as a closed system. Being an industrial size, these units can not be a portable systems and thus difficult to take them to the fields where the plant material is available in remote areas and distilling the fresh raw material is not possible in such a system which is one of the major parameter in affecting the quality of an essential oil. Being commercial scale units they requires more man power, operational costs etc., and the marginal farmers can not afford to purchase these industrial scale distillation units.

The widely used hydro distillation method in the essential oil industry is Steam distillation The units used to perform the Steam distillation method merely consists of a distillation tank with a false bottom fixed at a certain height from the bottom of the tank. A spurger is provided below the false bottom, which is connected to the industrial size boilers. The plant material is placed above the false bottom and then the lid is closed tightly by nut-bolts. Steam generated from the boiler is fed to the tank through the fixed steam spurger to commence the distillation. After few minutes the vapors starts forming which are taken to the vapor inlet of a shell and tube condenser, which is connected to the vapor out, let of the distillation tank at the top. The condensed liquid is collected in a receiver where the essential oil and distillate are separated.

The major drawbacks of the unit are that it cannot distill the plant material neither by Water distillation nor by Water and Steam distillation. Some parts of the aromatic herbs are preferably distill by Water distillation method to obtain better recoveries and quality. Also these units can not distill the plant material neither at reduced pressure nor at higher pressure since the system is opened to the atmospheric pressure and can not operated as a closed system. Being an industrial size these units cannot be a portable, and thus difficult to take them to the fields where the plant material is available in remote areas and distilling the fresh raw material is not possible in such a system which is one of the major parameter in affecting the consistency in the quality of an essential oil. Being commercial scale units they require more man power, operational costs etc., and the marginal farmer cannot afford to purchase these industrial scale distillation units.

Thus, apparatus, industrial scale units and the process mentioned above has one or the other major drawbacks like inferior oil quality, low oil recovery, low batch capacity, lack of water distillation, steam distillation and water and steam distillation facility, restricted mode of heating, unable to distill the plant material under vacuum and at higher pressures, difficulty in charging and discharging of plant materials because of narrow mouth and requires more attention during processing, more capital investment, operational cost.

OBJECTS OF THE INVENTION

The main object of the present invention is to provide a simple, convenient, portable mini distillation apparatus for the production of essential oils and hydrosols, which obviates the drawbacks as detailed above.

Another object of the present invention is to provide an apparatus for the distillation of essential oils having capacity little higher than the laboratory scale apparatus to meet the needs of marginal farmers.

Still another object of the present invention is to provide an apparatus for the distillation of essential oils, if required, slightly at higher and lower pressures than atmospheric pressure.

Yet another object of the present invention is to provide an apparatus for the distillation of essential oil by water distillation, water and steam distillation and steam distillation on small scale.

Yet another object of the present invention is to provide an apparatus for the production of perfumed water from aromatic plant materials at small scale.

Yet another object of the present invention is to provide an apparatus for the production of distilled water from the tap water or natural sources for lab use or for other purpose.

Yet another object of the present invention is to provide portable and convenient apparatus for effecting distillation even in the fields or remote farming areas.

Yet another object of the present invention is to provide an apparatus for the production of quality grade essential oils at household scale as a cottage industry to suit the marginal farmers/entrepreneurs who can not afford to install bigger capacity units.

SUMMARY OF THE INVENTION

Accordingly the present invention provides a simple, convenient and portable mini-distillation apparatus, essentially consists of main parts such as a distillation vessel (I); a cohobation column. (8), condenser (11) and oil retention column (13) with recycle line (16) connected to the cohobation column (8).

DETAILED DESCRIPTION OF THE INVENTION

Accordingly, the present invention provides a simple, convenient, portable mini-distillation apparatus as shown in FIG. 2 of the accompanying drawings, for the production of essential oils and hydrosols, which comprises one or more vessel(s) (1) capable of being heated either internally/externally or both, the inside bottom of the said vessel(s) being provided with a threaded rod (6) fixed concentrically in such a manner so as to allow vertical movement of a sieved false bottom (5), one or more steam spurger(s) (24) being provided between the vessel bottom (2) and the said movable false bottom (5, 7), the said vessel(s) being provided with lids(s) (3) having one or more safety valve(s) (21), said lid(s) being attached with the vessel by means of removable fixing means, the lid(s) are also provided with parameter gauges (20) such as pressure, vacuum, temperature gauges and a vapor outlet(s) (9), the said vapor outlet(s) being connected by known means to the inlet of one or more vertical cohobation column(s) (8), the outlet(s) of the said cohabitation column(s) being fixed by known means to the inlet (10) of a condenser (11) provided with closeable vent (15), the outlet (12) of the said condenser being detachably connected by ones or more connecting means (14) to a vertical receiver separator column (13) having a valve (18) at its lower end, which controls an outlet (23), the bottom and middle of the said receiver separator column being provided with a plurality of valves (17, 19) which control flow of fluids in one or more recycling means (16) connected to the upper portion of the said cohobation column(s).

In one embodiment of the present invention, the false bottom (5) in the vessel (1) is used to hold the plant material to be distilled by adjusting at a suitable height to accommodate the material.

In another embodiment of the invention, when the apparatus used in water distillation method, the false bottom (5) is removed completely from the vessel (1) or kept at the lowest possible height from the base and then the plant material is charged along with water for processing and the plant material is immersed in water.

In still another embodiment of the invention, when the apparatus is used in water and steam distillation method, the level of the water charged in the vessel (1) is kept below the false bottom (5) and the plant material is charged over the false bottom (5) which is adjusted by revolving clockwise or anti-clockwise as the case may be on the threaded rod (6), the false bottom (5) here is used to separate the plant material and water.

In still another embodiment of the invention, the false bottom (5) is so adjusted to accommodate the plant material, which is very less to distill in a given capacity of distillation unit preferably at least one fifth of the holding capacity of the unit to minimize or no loss of essential oil.

In yet another embodiment of the present invention, the apparatus comprising steam spurger (24) having holes is provided below the false bottom (5) in the vessel (1) and when steam is injected into the vessel through the steam spurger for distilling the plant material which is kept on the false bottom by steam distillation method.

In yet another embodiment of the present invention, the vessel is heated internally by means of known heating system preferably electrical system and externally by any conventional/non-conventional heating means/sources selected from fire woods, coal, oil, gas burners, boilers etc.

In yet another embodiment of the present invention, the vessel has a height to diameter ratio in the range of 0.5 to 1.5

In yet another embodiment of the present invention, the vessel, cohobation column, condenser and recycling pipes are made up of metals selected from stainless steel, copper, tin.

In yet another embodiment of the present invention, the receiver separator is made up of glass, coated with transparent plastic or covered with an aluminum casing.

In yet another embodiment of the present invention, the vertical receiver separator column is graduated.

In yet another embodiment of the present invention, the closeable vent (15) of the condenser is optionally connected through a valve to a vacuum pump.

In yet another embodiment of the present invention, the cohobation column is connected to the vessel, condenser by means of clamps with or without gaskets, o-rings, and threaded arrangements with or without gaskets. In yet another embodiment of the present invention, the condensing means is any conventional means such as water or air cooling condenser.

In yet another embodiment of the present invention, the vessel is provided with handles.

In yet another embodiment of the present invention, the steam spurger (24) is connected to one or more external steam sources such as boilers.

In yet another embodiment of the present invention, a part of fluids escaping from the condenser may be recirculated to the vessel (1) or collected in separate containers using known means.

In FIG. 2 of the drawings accompanying this specification, a schematic diagram of an embodiment of the apparatus of the present invention is shown. The present invention essentially consists of main parts such as a distillation vessel (I); a cohobation column. (8), condenser (11) and oil retention column (13) with recycle line (16) connected to the cohobation column (8).

One of the embodiment of the invention the present portable mini distillation unit provides a simple, convenient, portable apparatus for the distillation of essential oils which comprises charging of aromatic plant material along with water in the ratio in the range of 1:0 to 1:2 in the vessel (1) through the charging hole, as described above and depicted in FIG. 2, depending upon the type of the distillation process to be used. Place the gasket properly above the flange of the still, tighten the lid by quick fit joint (4) and attach the cohobation column (8), condenser (11) and glass tube (13) with the lid by tightening the union (9) after ensuring the proper setting of the gasket, place the whole system above the direct fired furnace/LPG burner/Kerosene or Diesel stove for heating the vessel (1). Fill the shell side of the condenser with water and the optimum water flow rate, for the total condensation, was maintained. Fill the oil retention glass tube (13) with water through air vent (15) at rear end of the condenser (11) until water starts flowing in to the cohobation column (8) through recycling line (16). The air vent (15) on the condenser (11) is opened throughout the process, if the plant material is to be distilled at atmospheric pressure and remain closed if the plant material is to be extracted under pressure. The valve (19) on the recycle line is kept opened throughout the process if essential oil only is to be distilled and remain closed if only perfumed distillate required. Now start heating the vessel (1) with any heating means mentioned above. Vapors start forming/ a few minutes later and enter to the condenser (11) through cohobation column (8) where they are condensed and collected in the glass tube. The essential oil in the distillate settles as an upper layer over the lower layer of water as the case may be. The aqueous part of the distillate is recycled, to the cohobation column (8) through the recycling line (16) if the essential oil is lighter than the water otherwise, it is recycled through the other pipe line shown in the FIG. 2 as a dotted line. In order to recover the dissolved oil, the process is continued for 3 to 5 hours depending upon the type of plant material and distillation performed. After the completion of process, the essential oil is collected from the outlet (23) of glass tube (13) by opening the valve (18).

The collected oil is measured and dried over anhydrous $Na_2SO_4$ filtered and then can be stored in aluminum bottles.

The constructional features of an embodiment of the apparatus of the present invention are given below:

A stainless steel (SS)-304 vessel (1) having internal diameter (ID)=325 mm, height=325 mm with slightly curved bottom (2) and wide mouth ID=325 mm for easier charging and discharging plant material is to be distilled, above which a conical lid (3) with base diameter=325 mm, vertical height=150 mm, slant height=210 mm to which a flange ID=325 mm, outer diameter (OD)=350 mm, is welded. The lid is attached to the vessel by a quick-fit joint (4). The material of construction (MOC) of lid (3) is stainless steel (SS)-304. A false bottom (5), 320 φ, 2 mm thickness (tk.), with 2 φ holes in triangle pitch and 10 φ hole in the center to fit in the threaded SS rod (6) with 10 φ for adjusting up and down according to the plant material charged. A circular strip (7) ID=315 mm, OD=325 mm welded to the vessel at a height of 35 mm from the bottom end to hold the false bottom. At the top of conical lid (3), a stainless steel cohobation column (8) is fixed with the help of union (9). The cohobation column (8) ID=50 mm up to at a height of 780 mm which is reduced to ID=40 mm up to a length of 215 mm and slant height of the reducer is 40 mm. The outlet of the column, ID=40 mm, is welded to a bend (10) having same ID. The bend is again welded to a stainless steel horizontal shell and tube I—I heat exchanger (condenser) (11) with ten number of SS seamless tubes ID=8 mm, length (L)=250 mm and shell ID=80 mm, L=330 mm including both the bonnets with an inclination of 120 with horizontal plane. The outlet (12) ID=25 mm, L=60 mm, of the distillate welded at the rear end of the condenser, is connected to graduated glass (13) tube by ¼" diameter nuts and bolts on flanges ID=25 mm, OD=110 mm for collecting the distillate and the essential oil. A silicon gasket (14) ID=25 mm, OD=75 mm, thickness (thk.)=2 mm is placed in between the flanges. An air vent (15) ID=5 mm on the condenser rear end is welded to distill the plant material at required pressures. A stainless steel recycling pipe (16) with ID=6 mm, L=540 mm is welded to the cohobation column at a height of 745 mm from the base of the glass column to recover the dissolved essential oil if the oil is lighter than the water. In case of oil being heavier than water, the recycle line is shown in dotted lines. The other end of the pipe is connected to the bottom of the glass tube ill=10 mm by means of flexible silicon tube (17). The glass tube for collecting the distillate is reduced from ID=20 mm, for a distance of L=80 mm at the outlet flange of the condenser, to ID=10 mm. The bottom of the glass tube (13) is again reduced to ID=1 mm (23) with a valve (18) in between for discharging the distillate and essential oil. The flexible silicon tube has a clip (19) to isolate the SS recycling pipe from the base of the glass tube. Length of the glass tube from its flange to recycle connection is 650 mm and length of the glass tube portion from recycle connection to oil drain out valve is 40 mm. Length of the glass tube from valve to the end of the capillary is 70 mm. A pressure gauge (20) and a safety valve (21) were fixed above the lid.

The novelty of the apparatus of the present invention is that the said apparatus is capable of providing water distillation, steam distillation, water and steam distillation at atmosphere pressure, as also above and below atmospheric pressure. Further, the apparatus is capable of distilling the heavier and lighter essential oils and also producing hydrosols (perfumed water) such as rose water, ajowain water, camphor water.

The inventive steps of the constructional features of the apparatus of the present invention apart from other modifications, preferably lies in incorporating (a) one or more steam spurgers between the vessel bottom and moveable sieved false bottom, (b) air vent capable of being connected through a valve to a vacuum pump and (c) a plurality of valve operated recycling lines.

BRIEF DESCRIPTION OF THE ACCOMPANYING DRAWINGS

Figure 1:
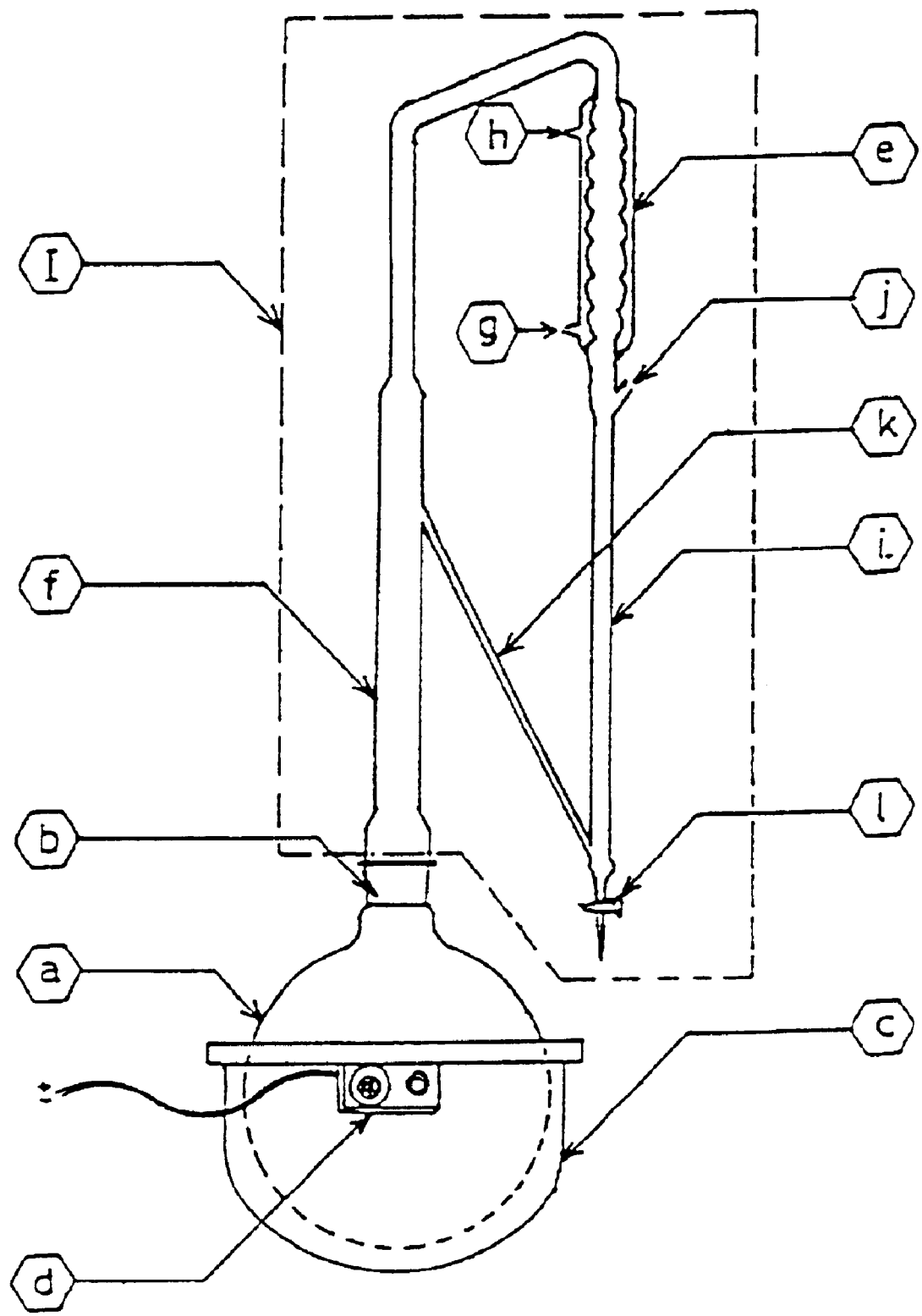
FIG. 1 shows the conventional distillation apparatus.
Figure 2:
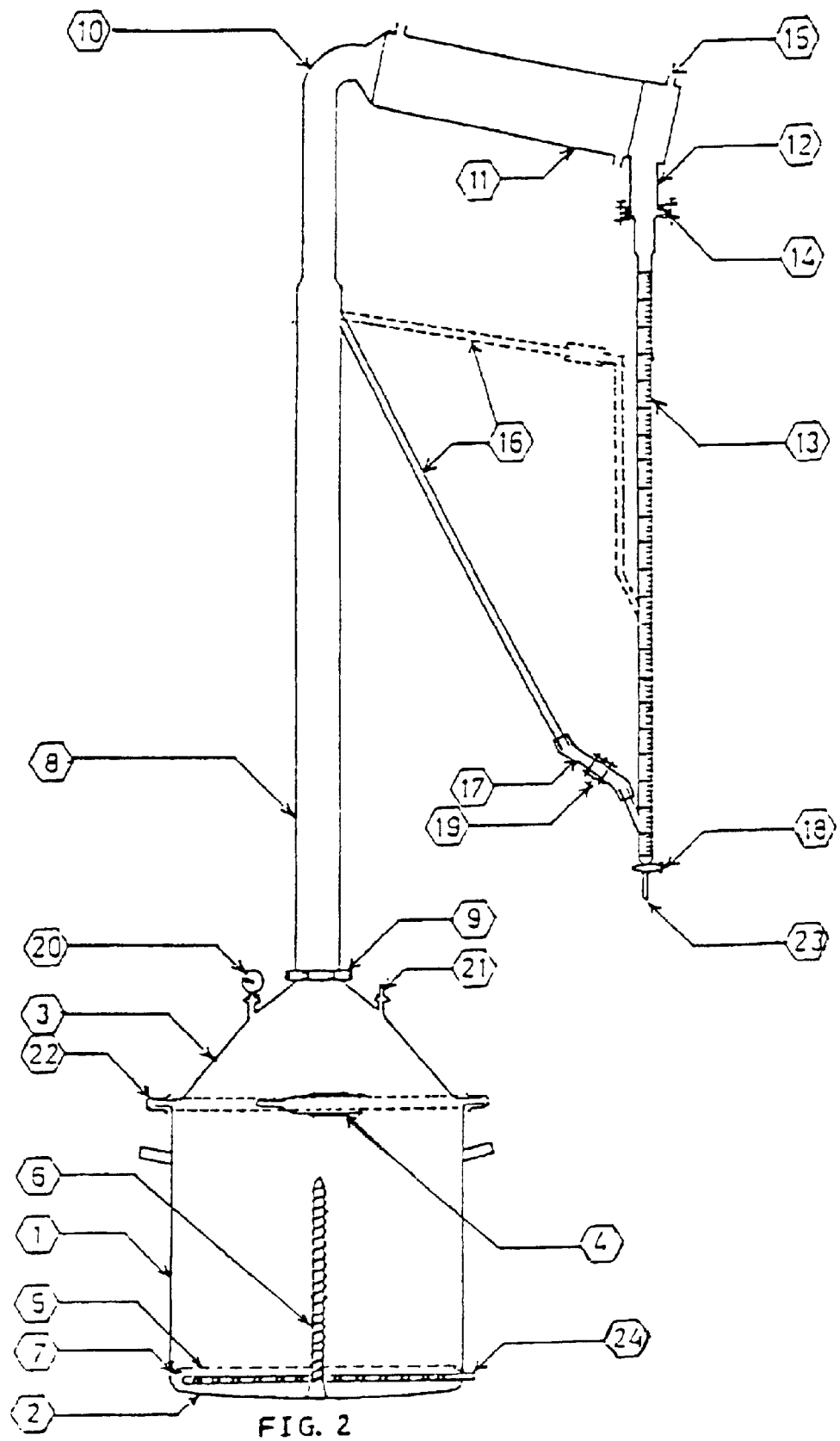
FIG. 2 shows the schematic diagram of the present invention.

The following examples are given by way of illustration of the device and the process of the present invention for the distillation of essential oils and should not be construed to limit the scope of the present invention.

EXAMPLE 1

In the beginning, 6 lit of fresh water were charged into the sterilized/rinsed vessel (1). Then, 3 kg of fresh Geranium leaves were placed above the false bottom. The false bottom was adjusted so that the distance between false bottom and water level was 80 mm (minimum). The vessel was placed above the furnace. The furnace was so constructed that the ¾ of the vessel when immersed into the furnace can get maximum heat in—put to distill the plant material. Before placing the vessel above the furnace, mud was coated outside of the vessel to reduce the soot formation on the walls of the vessel. The lid and cohobation columns were fitted above the flange of the vessel. It was ensured that the gasket on flange of the vessel and 'O' ring between the outlet of the lid to cohobation column was properly placed so that no leakage of vapor and liquid appeared. The flange of the graduated glass tube was also fixed with the flange of the condenser outlet. A silicon tube was also fixed to connect the recycling line to the oil receiving graduated glass tube. The furnace was fired with agro-waste to heat the mixture in the vessel. After a few minutes, the water below the false bottom started boiling and formed steam, which then passes through the Geranium leaves and extracts essential oil present in it. The steam comes out with the oil and reaches the condenser through cohobation column, the steam was enriched with oil in cohobation column, and condensed in the condenser. The condensate was collected in the graduated glass tube. The oil as its density was lower than the water, settled as an upper layer and the oil saturated water, as a lower layer. The oil-saturated water was recycled through recycling line, connected at the bottom of oil receiver to the cohobation column, to recover oil present in it. The process was continued for 3 hr. by maintaining the flow rate of the distillate around 1.5 ml/min. The range of shell side fluid flow rate in the condenser was maintained in such a way that the temperature of the condensate was around 20° C. At the end of the process the fire in the hearth was stopped. There after the flow rate of distillate from condenser was also stopped followed by stoppage of water connection to the condenser. The oil collected in the graduated glass receiver was measured to 6.9 ml with a recovery of 0.23%. Two kg of same sample of Geranium leaves was also distilled simultaneously, in a glass Clevenger type apparatus as discussed in prior art and the oil yield was recorded to be 3.4 ml with a recovery of 0.17%. The quality analysis was done by gas chromatographic analysis and the results are given below in Table No 1.

TABLE 1

| Constituents | Present invention (%) (Mini distillation apparatus) | Prior art (%) (Clevenger apparatus) |
| --- | --- | --- |
| Cis-rose oxide | 0.09 | 0.09 |
| Trans-rose oxide | 0.02 | 0.02 |
| Isomenthone | 5.3 | 5.2 |
| Citronellyl formate | 5.7 (18% extra) | 4.8 |
| Geranyl formate | 6.0 (Double) | 3.0 |
| Citronellol | 23.3 (8% extra) | 21.4 |
| Geraniol. | 28.6 (29% extra) | 22.1 |
| Epi-γ-eudesmol | 5.4 | 5.3 |
| Geranyl tiglate | 1.7 | 1.6 |

Thus, quality and quantity of the oil distilled in this apparatus was found to be better than Clevenger type apparatus.

EXAMPLE 2

The false bottom (5) was adjusted by rotating to fix at a height above the water level before placing the still (1) above the LPG burner. The still was charged with 3 kg of fresh *Tagetes minuta* (whole herb) along with 4 lit of fresh water, the whole material was processed by water and hydro-distillation. The gasket (22) was placed properly above the flange of the still and tightened the flange by quick fit clamp (4). The whole system was attached with the lid by tightening the union (9) after ensuring the proper setting of the gasket The water connection was given from tap to the condenser through rubber tube to fill the shell side of the condenser with water. Support was given to the whole system by fixing with the stand so that it can withstand the impulses. The oil retention glass tube ( 13) was filled with water through air vent (15) welded at the rear end of the condenser till water starts flowing into the cohobation tower (8) through recycling line (16) The valve (19) was remained open on the recycle line, throughout the process, main vessel (I) was started heating by lightening the LPG gas burner. After a few minutes vapor started forming, if proper heat is provided, the vapors formed were condensed in a condenser (II) and collected in a oil retention glass tube (13 ). The essential oil part of the distillate was settled as an upper layer and oil saturated water as a lower layer. The batch process was continued for 3 hr to recover the total oil. Heating was stopped after completion of process. The oil settled in the graduated glass column forming upper layer, was measured to 16 ml with a recovery of 0.53 and collected, by opening a valve (18~and draining out the oil saturated water first then collecting the oil through the outlet (23) in a separate container. The water droplets in the oil are dried with anhydrous sodium sulphate. Simultaneously, 2 kg of same plant material *Tagetes minuta* was charged into the Clevenger type apparatus and distilled for 3 hr. After completion of the process the oil yielded was recorded as 6 ml with a recovery of 0.3%. Thus, the efficiency of the present invention was 1.5 times the Clevenger type apparatus. The quality analysis was done by gas chromatographic analysis and the results are given below in Table No 2.

TABLE 2

| Constituents | Present invention (%) (Mini distillation apparatus) | Prior art (%) (Clevenger apparatus) |
| --- | --- | --- |
| Cocimene | 38.13 | 36.41 |
| Dihydrotagetone | 28.65 | 13.95 |
| E-Tagetone | 0.98 | 0.9 |
| Z-Tagetone | 9.88 | 9.53 |
| E-Ocimenone | 10.9 | 7.3 |
| Z-Ocimenone | 11.2 | 6.2 |

The oil distilled by apparatus of the present invention was of improved quality as compared to oil distilled using Clevenger apparatus, as can be seen from the results with respect to constituents as given in Table 2 above.

Dihydrotagetone was found 28.6% in mini distillation unit and less (13.9%) in Clevenger oil. Similarly, E and Z ocimenones are found in higher percentage (10.9% and 11.2%) as compared to Clevenger oil distilled which was in low percentage. In the case of tagetones, the marginal variations was found in E—tagetone which is also one of the quality determining constituents.

The overall quality of oil distilled from mini distillation unit was found better than distilled from Clevenger apparatus.

The Main Advantages of the Present Invention are:

1. The unit is useful for the distillation of essential oils and perfumed water from a number of aromatic herbs available in applicants surroundings such as Basil, Kari patta, Ajowain, Eucalyptus, Mints, Citrus peels, Muskbala, Bachh, Wild Marigold and cultivated aromatic crops like Damask rose, Lavender, Marigold and Chamomile.

2. The plant material can be distilled at atmospheric pressure and also at higher or lower pressures than atmospheric pressure, with all the three-hydro distillation methods.

3. The unit is portable and can be used in the fields where water and power sources are available.

4. Water distillation. Steam distillation and Water and Steam distillation can be done.

5. Household cottage industry for marginal farmers and housewives.

6. Can be used for demonstration, training and education purpose in R&D- and Educational institutes.

7. Employment and income generation for economically backward classes.

8. This apparatus has been designed to meet the needs of small growers and entrepreneurs who wish to start at a small scale and to learn the art, skill and science of essential oil production at an affordable price.

9. The qualitative and quantitative yields are better than the Clevenger type apparatus.

10. The unit being quite inexpensive and sturdy, even small farmers can install their individual units.

What is claimed is:

1. A simple, convenient, portable mini-distillation apparatus for the production of essential oils and hydrosols, which comprises one or more vessel(s) (1) capable of being heated either internally/eternally or both, the inside bottom of the said vessel(s) being provided with a threaded rod (6) fixed concentrically in such a manner so as to allow vertical movement of a sieved false bottom (5), one or more steam spurger(s) (24) being provided between the vessel bottom (2) and the said movable false bottom (5, 7), the said vessel(s) being provided with lids(s) (3) having one or more safety valve(s) (21), said lid(s) being attached with the vessel by means of removable fixing means, the lid(s) are also provided with parameter gauges (20) and a vapor outlet(s) (9), the said vapor outlet(s) being connected by known means to the inlet of one or more vertical cohobation column(s) (8), the outlet(s) of the said cohobation column(s) being fixed by known means to the inlet (10) of a condenser (11) provided with closeable vent (15), the outlet (12) of the said condenser being detachably connected by one or more connecting means (14) to a vertical receiver-separator column (13) having a valve (18) at its lower end, which controls an outlet (23), the bottom and middle of the said receiver-separator column being provided with a plurality of valves (17, 19) which control flow of fluids in one or more recycling means (16) connected to the upper portion of the said cohobation column(s).

2. An apparatus as claimed in claim 1 wherein the false bottom (5) in the vessel (1) is used to hold the plant material to be distilled by adjusting at a suitable height to accommodate the material.

3. An apparatus as claimed in claim 1 wherein, when the apparatus used in water distillation method, the false bottom (5) is removed completely from the vessel (1) or kept at the lowest possible height from the base and then the plant material is charged along with water for processing and the plant material is immersed in water.

4. An apparatus as claimed in claim 1 wherein, when the apparatus is used in water and steam distillation method, the level of the water charged in the vessel (1) is kept below the false bottom (5) and the plant material is charged over the false bottom (5) which is adjusted by revolving clockwise or anti-clockwise as the case may be on the threaded rod (6), the false bottom (5) here is used to separate the plant material and water.

5. An apparatus as claimed in claim 4 wherein, the false bottom (5) is so adjusted to accommodate the plant material which is less likely to distill in a given capacity of distillation unit to at least one fifth of the holding capacity of the unit to minimize loss of essential oil.

6. An apparatus as claimed in claim 1 comprising steam spurger (24) having holes is provided below the false bottom (5) in the vessel (1) and when steam is injected into the vessel through the steam spurger for distilling the plant material which is kept on the false bottom by steam distillation method.

7. An apparatus as claimed in claim 1 wherein the vessel is heated internally by means of known heating system and externally by any conventional/non-conventional heating means/sources selected from fire woods, coal, oil, gas burners, or boilers.

8. An apparatus as claimed in claim 1, wherein the vessel has a height to diameter ratio in the range of 0.5 to 1.5.

9. An apparatus as claimed in claim 1, wherein the vessel, cohobation column, condenser and recycling pipes are made up of metals selected from the group consisting of stainless steel, copper, and tin.

10. An apparatus as claimed in claim 1, wherein the receiver separator is made up of glass, coated with transparent plastic or covered with an aluminum casing.

11. An apparatus as claimed in claim 1 wherein, the vertical receiver separator column is graduated.

12. An apparatus as claimed in claim 1, wherein the closeable vent (15) of the condenser is optionally connected through a valve to a vacuum pump.

13. An apparatus as claimed in claim 1 wherein, the cohobation column is connected to the vessel, condenser by means of clamps with or without gaskets, O-rings, threaded arrangements with or without gaskets.

14. An apparatus as claimed in claim 1 wherein, the condensing means is any conventional means such as water or air cooling condenser.

15. An apparatus as claimed in claim 1, wherein the vessel is provided with handles.

16. An apparatus as claimed in claim 1, wherein the steam spurger (24) is connected to one or more external steam sources such as boilers.

17. An apparatus as claimed in claim 1 wherein, the fluids escaping from the condenser may be recirculated to the vessel (1) or collected in separate containers using known means.

* * * * *

UNITED STATES PATENT AND TRADEMARK OFFICE
CERTIFICATE OF CORRECTION

PATENT NO. : 6,911,119 B2  Page 1 of 1
DATED : June 28, 2005
INVENTOR(S) : Garikapati D. Kiran Babu et al.

It is certified that error appears in the above-identified patent and that said Letters Patent is hereby corrected as shown below:

Title page,
Item [57], ABSTRACT,
Line 7, "perform" should be -- performed --;

Column 2,
Line 65, "distill" should be -- distilled --;

Column 9,
Line 63, "internally/eternally" should be -- internally/externally --.

Signed and Sealed this

Eighth Day of November, 2005

JON W. DUDAS
*Director of the United States Patent and Trademark Office*